J. Carhart,

Organ Bellows.

No. 484. Reissued Aug. 18, 1857.

AM. PHOTO-LITHO. CO. N.Y. (OSBORNE'S PROCESS)

UNITED STATES PATENT OFFICE.

JEREMIAH CARHART, OF NEW YORK, N. Y.

IMPROVEMENT IN REED MUSICAL INSTRUMENTS.

Specification forming part of Letters Patent No. 4,912, dated December 28, 1846; Reissue No. 373, dated June 24, 1856; Reissue No. 484, dated August 18, 1857.

*To all whom it may concern:*

Be it known that I, JEREMIAH CARHART, of the city of New York, in the county of New York and the State of New York, have invented new and useful improvements in that class of musical instruments called melodeons, seraphines, aeolian attachments, &c., or in the bellows therefor; and I do hereby declare that the following is a full, clear, and exact description of the principle or character which distinguishes them from all other things before known and of the manner of making, constructing, and using the same, reference being had to the accompanying drawings, making a part of this specification, in which—

Figure 1:
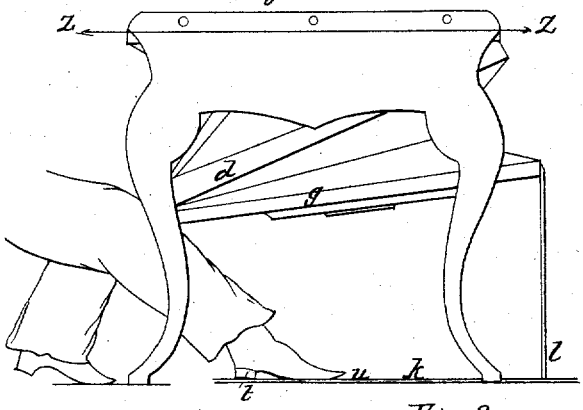
Figure 3:
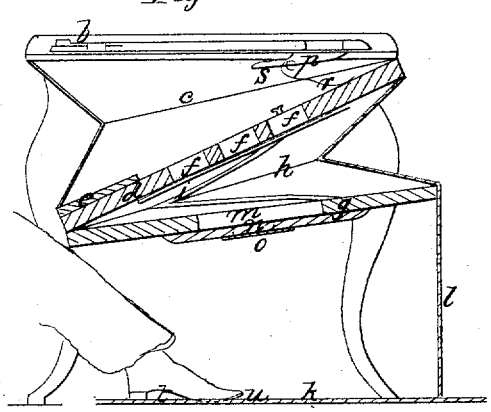
Figure 2:
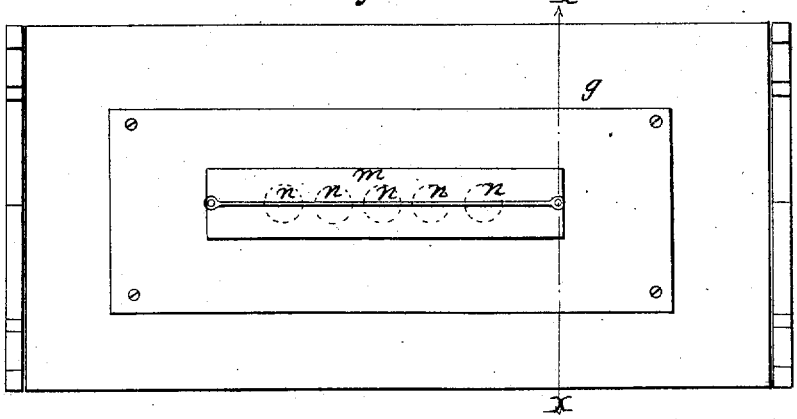
Figure 4:
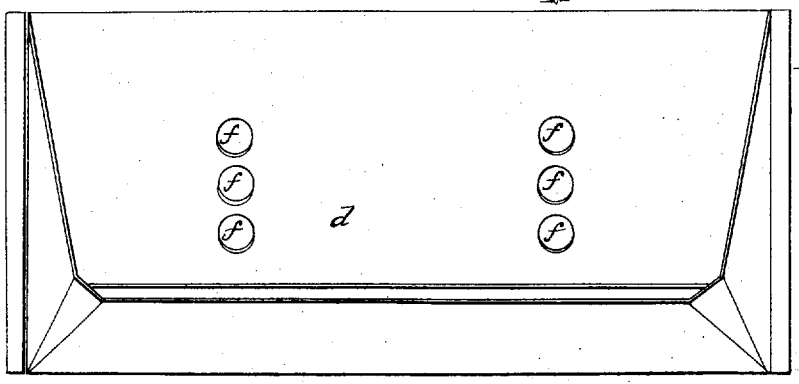

Figure 1 is an end elevation of the frame and lower part of the instrument; Fig. 2, an inverted bottom view; Fig. 3, a vertical section of Fig. 1 taken at the line *x x* of Fig. 2; and Fig. 4, a horizontal section taken at the line *z z* of Fig. 1 below the sound-board and reeds. Fig. 5 is a complete cross-section of the instrument, showing the parts above as well as below the reeds.

The same letters indicate like parts in all the figures.

The object of my invention is to improve the tone of the reeds and to impart to them promptness and certainty in responding to the touch of the keys, and at the same time to give a compact and convenient and graceful form to the instrument.

In instruments constructed before my improvements some parts of the reeds were uniformly found to be slow in speaking, and would often fail entirely—they would either not speak at all or would give their tones out of time. The sound of the reeds was also disagreeable, "reedy," and nasal to such a degree that the instrument could not be extensively introduced. In all or nearly all of these instruments the bellows used was so arranged as to blow the air through the reeds, and in all the attempts previously made to produce the tones by exhaustion the instruments have been so encumbered with tubes and wind-chests between the bellows and the reeds that pre-existing evils have rather been increased than diminished, although the exhausting-bellows, when properly used, is a vast improvement over the blast-bellows.

I construct my bellows to operate by exhaustion with two chambers, the one drawing the air from the other, the first having a tendency by weight or spring to expand with a force equal to about seven pounds to the square foot, and the other tending by similar means to close to expel the air within it. The upper leaf of the exhaust-chamber of my bellows is firmly attached to the frame of the instrument a little below the "key-frame." The openings for the reeds are made through this board. Directly over each reed seat is a cap, closely fitting upon the reed-board, forming a cell over the reed and reed-openings about the length of the reed. This cell is open at the one end of the reed, but closed at the other, and is in width and in depth on an average about three-eighths of an inch, but should be slightly increased for the large reeds and diminished for the small ones. About three inches from the mouth of the reed-cells and on the same leaf of the exhaust-chamber I place a board in a vertical position, which I call the "concentrating-board," which extends to the ends and top of the instrument, thus forming a narrow chamber, open substantially at the top, but extending the whole length of the reed-board. By the use of these cells on my bellows the tone of the reeds is greatly improved and their speaking accelerated, and the concentrating-chamber also much increases its richness.

In the accompanying drawings, *a* represents the sound board or table to which the reeds *b b* are secured in any desired or well-known manner with the reeds above, so that the tone shall be produced by currents passing toward the bellows. I prefer to attach the reeds by sliding their frames (the reeds being uppermost) into side grooves at the bottom of the reed-cells. The reeds are placed over apertures in the sound-board, which may be called "reed openings or apertures," in the usual manner, leading to the first chamber *c*, formed by the sound-board and the first flap *d*, which is jointed in any desired manner to the back of the sound-board and connected to the ends and the front by means usually employed in connecting the flaps of bellows.

*p* is the cell over the reed, which should be so arranged with reference to the reed and reed-openings and the direction of the current of air that the air shall pass the reed and through the reed-opening from the cell. This arrangement is clearly shown in Fig. 5.

*s'* the swell; *t*, the concentrating-board; *l*, the board containing the cells; F, the key-frame; *k k*, the keys; *r*, the valve-pin, and *v* the valve under the reed-openings.

The forward edge of the first flap has a weight, *e*, attached to it, which tends constantly to draw it down by an equal force, to give an equal current of air, and therefore to produce a regular vibration of the reeds. The first flap is provided with two series of apertures, *f f*, covered by valves on the under side, made in manner to be hereinafter described. To the weighted edge of this first flap is jointed the second flap, *g*, the two being connected at the ends and back to form the second chamber, *h*, in the same manner as the first is connected with the sound-board; and these two flaps are drawn together by a spring, *i*, one leaf of which is secured to each of them, so that whenever the foot is removed from a treadle, *k*, connected with the second flap by a strap, *l*, this spring draws it right up against the first flap, by which action all the air previously contained in the second chamber is forced out through a valve, *m*, and when this flap is drawn down by the pressure of the foot on the treadle the air contained in the first chamber is exhausted therefrom, and as this process of exhaustion goes on, the pressure of the atmosphere preponderates over the weight on the first flap and forces it up, so that when the second flap is relieved of the pressure of the foot the spring immediately begins to draw it up. This relieves the first flap of the pressure of the atmosphere, which acts on it by the intervention of the second flap jointed to it, whereupon the weight begins to descend to keep up the constant and steady action of the air on the reeds.

The manner in which the pressure of the atmosphere acts to force up the first flap when the first chamber is partly exhausted will be evident when it is observed that the second flap is drawn down by one edge, the other being jointed to the front edge of the first flap, so that the pressure of the atmosphere on the under side of the second flap tends to force up the two flaps, notwithstanding the back of the lower one is carried down by the treadle, the connection of the treadle acting merely as a movable fulcrum for the upward movement of the front of the two flaps when forced up by the pressure of the atmosphere.

The valves of the two flaps are formed by a strip of thin leather or other like material secured at each end over a hole or series of holes, *n*, (shown by dotted lines in Fig. 2,) and then over this leather is stretched a strip or cord, *o*, of india-rubber or other similar elastic substance, which permits the leather to open sufficiently for the passage of the air, but which at the same time prevents the leather from sagging down so far as to flap and make a noise when suddenly closed by the pressure of the air, as would be the case after being in use for a short time without the spring.

The upper or first chamber is provided with an escape hinge-valve, P, opening inward, and kept closed by a spring, *r*, but which is opened by the upper or first flap striking the lever *s* of the valve when the operator works the lower or second flap faster than is necessary. The treadle K, which cannot be attached to the floor conveniently, is cut out, as at *t*, (as represented by dotted lines in Figs. 1 and 3,) sufficiently to permit the heel of the operator's foot to pass through and rest upon the floor, to prevent the treadle from being pushed forward when the forward part of the foot acts on the part *u* to bear it down.

It will be obvious that other kinds of valves may be substituted for those described without changing the leading part of my invention, and that any other appropriate spring may be employed to draw together the two flaps; and, finally, that any desired mode of connecting the various parts may be employed so long as the character of my invention or any part of it is retained.

It is obvious that many changes in form and in the mere arrangements of parts may be made without departing in the least from the principle of my invention.

Having fully described my improvements, what I claim as my invention, and desire to secure by Letters Patent, is—

1. So connecting the board which contains the reed-seats, or perforations for the reeds, with the exhausting-bellows, that it shall form substantially a part of the stationary leaf, or cover of the exhaust-chamber thereof, while the exhausting or pumping chamber is placed in immediate connection with the said exhaust-chamber without the intervention of tubes, thus improving the tone of the reeds and expediting their speaking, and giving a compact, light, convenient, and graceful form to the instrument, substantially as described.

2. The reed-cells, in combination with the reed seats or openings, substantially as described.

3. The concentrating-chamber, in combination with the reed-cells and reed-seats, substantially as described.

4. The last two combinations specified only when they are to be used with a suction or exhaust bellows capable of producing a continous current of air through the reed-opening, as set forth.

J. CARHART.

Witnesses:
W. P. N. FITZGERALD,
JOHN J. MURRAY.